(12) United States Patent
Haun

(10) Patent No.: US 7,416,690 B2
(45) Date of Patent: *Aug. 26, 2008

(54) METHOD FOR MAKING PRODUCT FROM FIBER GLASS WASTE

(76) Inventor: Michael J. Haun, 5819 LaCuesta Dr., Santa Rosa, CA (US) 95409

( * ) Notice: Subject to any disclaimer, the term of this patent is extended or adjusted under 35 U.S.C. 154(b) by 618 days.

This patent is subject to a terminal disclaimer.

(21) Appl. No.: 10/725,171

(22) Filed: Dec. 1, 2003

(65) Prior Publication Data

US 2005/0242477 A1     Nov. 3, 2005

Related U.S. Application Data

(63) Continuation of application No. PCT/US02/19483, filed on Jun. 20, 2002.

(60) Provisional application No. 60/301,959, filed on Jun. 28, 2001.

(51) Int. Cl.
*D01F 13/00* (2006.01)
*C03B 19/09* (2006.01)
*C04B 35/00* (2006.01)

(52) U.S. Cl. .................. 264/37.28; 264/109; 65/17.3; 501/155

(58) Field of Classification Search .......... 501/27, 501/32, 36, 155; 65/17.3, 473; 264/37.28
See application file for complete search history.

(56) References Cited

U.S. PATENT DOCUMENTS

| | | | |
|---|---|---|---|
| 3,963,503 A | 6/1976 | Mackenzie | |
| 3,963,506 A | 6/1976 | Shutt et al. | |
| 4,145,202 A | 3/1979 | Grodin et al. | |
| 4,271,109 A | 6/1981 | Boyce | |
| 4,341,566 A * | 7/1982 | Barrett et al. | 106/313 |
| 5,028,569 A | 7/1991 | Cihon | |
| 5,244,850 A | 9/1993 | Dutton | |
| 5,343,630 A | 9/1994 | Ferguson, Sr. | |
| 5,536,345 A | 7/1996 | Lingart | |
| 5,583,079 A | 12/1996 | Golitz et al. | |
| 5,649,987 A | 7/1997 | Greulich | |
| 5,792,524 A | 8/1998 | Lingart et al. | |
| 5,814,572 A | 9/1998 | Saiki et al. | |
| 5,830,251 A * | 11/1998 | Simpson et al. | 65/17.3 |
| 5,895,511 A * | 4/1999 | Tikhonova | 65/17.6 |
| 6,340,650 B1 | 1/2002 | Haun | |

OTHER PUBLICATIONS

N. M. P. Low, Fabrication of Cellular Structure Composite . . . .
W. M. Brown and K. J.D. Mackenzie, Process Design for the Production . . . .
W. Liu, S. Li, and Z. Zhang, Sintered Mosaic Glass . . . .

* cited by examiner

*Primary Examiner*—Steven P. Griffin
*Assistant Examiner*—Russell J Kemmerle, III

(57) ABSTRACT

The invention provides a method to transform large quantities of fiber glass waste into useful ceramic products by a low-cost manufacturing process. The method consists of reducing the fiber glass waste into a glass powder; mixing the glass powder with additives into a glass-additives mixture; granulating the glass-additives mixture into granulated particles; forming the granulated particles into a green ceramic article; and heating the green ceramic article into the ceramic product. Water and clay can be included in the processing. Only one firing step is needed with a low peak firing temperature of about 700° C. to about 1000° C. The method conserves energy and natural resources compared to clay-based traditional ceramic manufacturing. High-quality impervious ceramic products can be produced by the invention.

25 Claims, No Drawings

METHOD FOR MAKING PRODUCT FROM FIBER GLASS WASTE

CROSS REFERENCE TO RELATED APPLICATIONS

I claim the benefit of U.S. Provisional Application No. 60/301,959 which was filed on Jun. 28, 2001.

BACKGROUND OF THE INVENTION

The invention is directed to ceramic products made from fiber glass waste; raw batch formulations for making ceramic products from fiber glass waste; and a method for making ceramic products from fiber glass waste. Examples of ceramic products that can be made by the invention are tile and brick, but other ceramic products can also be made. The invention addresses two current problems: energy usage by the ceramic industry needs to be reduced; and new technology is needed to reprocess fiber glass waste into useful products.

The ceramic industry consumes large amounts of energy, especially during the firing process. Firing temperatures greater than 1200° C. (2200° F.) are required to sinter typical ceramic raw materials into dense products. Modifications of the raw material formulations have led to reductions in firing temperatures, but the improvements are limited because of the types of raw materials used. Most traditional ceramic products, such as tile and brick, consist mainly of clay-based raw materials, which inherently require high firing temperatures. Other ceramic manufacturing steps, such as the drying processes, are also very energy intensive. Energy costs are a major portion of the total manufacturing costs, and thus new methods to reduce the amount of energy required will be a great benefit to the ceramic industry.

The fiber glass industry produces large amounts of fiber glass waste that currently can not be economically recycled, and thus is disposed of in landfills. Fiber glass waste is generated during the fiber forming process, and also during the manufacture of fiber glass products. Fiber glass wastes are potentially recyclable by remelting to form new glass fibers. However, fiber glass waste is generally not remelted, because impurities in the waste lead to unacceptable levels of fiber breakage during the forming process. Recycled glass, referred to as cullet, is commonly used as 20-35% of the raw materials in the manufacture of many types of glass products. Cullet is also used in some types of fiber glass manufacturing, but is mainly from container and flat glass sources.

The two main types of fiber glass are wool for insulation products, and continuous fibers for textile products. Fiber glass wool is formed by rapidly spinning molten glass through holes in a rotating cylindrical container. Continuous glass fibers are formed by drawing molten glass through precious metal bushings. In both methods the fibers are rapidly cooled by air or steam blowers. An organic chemical treatment of size is then applied to minimize fiber-to-fiber abrasion during processing, and to provide coatings necessary for the particular product application.

During processing various malfunctions periodically occur, such as fiber breakage, which result in waste material. The coating of size on the fibers prevents immediate reuse of the waste as cullet, because the size causes unacceptable amounts of residual carbon to form in the melt. Additional processing steps can be used to remove the size prior to melting, but this additional processing is not economical compared to the use of raw batch materials. Studies further indicate that even when the size is removed, other contaminants are present which result in high rates of fiber breakage during forming. Because of these problems, large volumes of fiber glass waste are currently disposed of in landfills. New technology is needed to reprocess this industrial waste into useful products.

Waste glass in the invention refers to any industrial or post-consumer fiber glass that is discarded. Any form of fiber glass, such as continuous fibers for textile products or wool for insulation products, can be used. In addition, any other forms of waste glass from fiber glass melting processes, such as drain glass, can also be used in the invention. Fiber glass waste can be obtained from fiber glass manufacturers, but other sources of fiber glass can also be used. There are various types of fiber glass compositions designed for a wide range of applications. Fiber glass compositions typically soften from about 650 to about 800° C. This unique softening behavior causes articles formed from fine powders of fiber glass to densify by viscous-phase sintering at temperatures much lower than usually required to fire ceramic products. The invention utilizes the low-temperature densification behavior of fiber glass to reduce manufacturing costs by conserving energy and lowering equipment and maintenance expenses.

The invention is novel, because a high-quality ceramic product can be manufactured at low cost from up to 100% fiber glass waste. The invention conserves energy and natural resources compared to traditional ceramic processing methods. An impervious ceramic microstructure with only a small amount of porosity can be achieved. Impervious refers to ceramic products with very low water absorptions of less than 0.5%. An impervious ceramic microstructure with a small amount of porosity is critical to achieve high-quality properties. Ceramic products can be produced by the invention with a wide range of colors with smooth glossy glaze-like surfaces. The surface texture and other fired properties can also be adjusted by the addition of fillers, and/or by partial crystallization of the glass.

Previous methods have been developed to produce ceramic products from waste glass. U.S. Pat. No. 6,340,650 reviews processing problems that result from previous methods, and provides a method to eliminate these problems by avoiding the use of water and clay in the processing. There are several types of fiber glass compositions. These compositions are designed to be less susceptible to chemical reaction with water compared to container and flat glass compositions, because of the large surface area of fiber glass. Less sensitivity to reaction with water allows greater flexibility in processing of fiber glass compared to container or flat glass. In addition, some fiber glass compositions, such as E-glass, have higher softening temperatures compared to container and flat glass compositions. The higher softening temperature allows clay and other ceramic raw materials that produce volatile species during firing to be included in the raw batch formulation without adversely affecting the densification behavior. The present invention provides a method of making ceramic products from fiber glass waste where water and clay can be added during processing.

It was also unexpected that the use of fiber glass would provide several other significant advantages compared to the use of container or flat glass. This is because of differences in composition and contaminants, but especially because of the different forms of glass (fibers versus bulk glass). Processing container or flat glass into a fine powder involves two or three energy-intensive crushing and grinding steps. Glass fibers are typically 3-100 micrometers in diameter, and thus only one dimension needs to be broken to produce very fine powder. Chopping or milling of fiber glass is much simpler and less energy intensive compared to crushing container or flat glass. Industrial sources of fiber glass waste are very uniform in composition with much less contamination compared to post consumer container glass. This allows more control over color and other properties of the ceramic product produced. In addition, the significantly lower thermal expansion coefficients of fiber glass compositions compared to container and flat glass offers the possibility of improved thermal shock resistance.

The invention offers a variety of environmental benefits compared to current practices. The method completely transforms fiber glass into a dense ceramic product, so that all future environmental problems in the handling and disposal of the fibers is eliminated. By using recycled glass as the raw material; mining, processing, and transportation of traditional raw materials is not required. The invention requires substantially less energy compared to traditional clay-based tile production, and especially compared to glass-melting methods of producing tile. This is mainly because of greatly reduced firing temperatures of 700-1000° C., compared to 1200° C. for clay-based tile, and >1500° C. for melt-based tile.

BRIEF SUMMARY OF THE INVENTION

The invention provides a method to transform large quantities of fiber glass waste into useful ceramic products by a low-cost manufacturing process. The method consists of reducing the fiber glass waste into a glass powder; mixing the glass powder with additives into a glass-additives mixture; granulating the glass-additives mixture into granulated particles; forming the granulated particles into a green ceramic article; and heating the green ceramic article into the ceramic product. Water and clay can be included in the processing. Only one firing step is needed with a low peak firing temperature of about 700° C. to about 1000° C. The method conserves energy and natural resources compared to clay-based traditional ceramic manufacturing. High-quality impervious ceramic products can be produced by the invention.

DETAILED DESCRIPTION OF THE INVENTION

The raw batch formulations of the invention consist of 70-100% fiber glass waste, 0-20% filler, and 0-10% organic binder. Preferred raw batch formulations consist of 84-100% waste glass, 0-10% filler, and 0-6% organic binder. All percentages are based on weight. It is also understood that other common ceramic processing additives, such as wetting agents, surfactants, deflocculants, coagulants, flocculants, plasticizers, antifoaming agents, lubricants, preservatives, etc. can be added to the raw batch formulation to further optimize the processing without changing the scope of the invention.

The organic binder and other organic additives (if included) will burn out during firing, and thus are not part of the final product. The fiber glass waste and filler are inorganic components that remain after firing, and make up the final product composition. The initial raw batch formulation (given above) therefore transforms during firing to the final product composition consisting of 80-100% fiber glass waste and 0-20% filler. The preferred final product composition consists of 90-100% waste glass and 0-10% filler. The final product composition is determined by subtracting the organic binder amount from the raw batch formulation, and then renormallizing the remaining composition to 100%.

The filler in the invention is a ceramic raw material added to modify the color, surface texture, or any other property of the final product, or to act as an inorganic binder. An inorganic binder filler, such as clay or sodium silicate, will act as a binder during the granulation and pressing steps, and reduce or eliminate the need for the organic binder. The addition of a filler is not necessary to make a high quality ceramic product, but may be desired to produce a specific set of properties in the final product. A wide range of filler additives can be used in the invention individually or in combination.

A filler added to control the color is referred to as a colorant. Common ceramic colorants can be used to produce ceramic products by the invention with a wide range of colors. Examples of individual oxide colorants are cobalt oxide to produce blue colors, chromium oxide for greens, and iron oxide for reds. Many commercial colorants are available based on complicated combinations of oxides which are often melted to form glass frits. In addition to the color, the addition of fillers can control other characteristics and properties, such as surface texture, crystallization behavior, and mechanical, thermal, and chemical durability properties. Other examples of fillers are alumina, silica, zirconia, and clay.

The fiber glass waste and fillers must be in powder form to be used in the raw batch formulations. The powder particle size required depends on the final properties desired. For the invention the fiber glass waste and filler powders have particle sizes <30 mesh (<0.6 mm). The preferred size is <100 mesh (<0.1 mm). The particle size of fiber glass is controlled by the fiber length, because the fiber diameters are less than the required sizes. Coarser particle size fillers can also be included in the raw batch formulations to adjust the properties of the final product. For example, coarser fillers can be added to produce a rougher surface texture to increase the coefficient of friction and slip resistance.

The organic binder in the invention consists of any organic material that can be added to bond the inorganic waste glass and filler particles together. The organic binder is initially mixed with fiber glass waste and filler particles to form a granulated free-flowing powder. This powder is then formed into the ceramic articles. After the forming step, the organic binder provides enough strength in the unfired article for handling and transport to the firing step. The amount of organic binder needed can be reduced, or even eliminated, if an inorganic binder is added as a filler.

Examples of organic binders are natural gums, cellulose ethers, polymerized alcohols, acrylic resins, glycols, and waxes. Polyethylene glycol and polyvinyl alcohol were used as organic binders in the examples of the invention given below. Other organic binders can be used without changing the scope of the invention. To be effective the organic binder needs to be in liquid form, so that the inorganic fiber glass and filler particles can be wetted and coated by the organic binder. Organic binders at room temperature (~20° C. ) are in either liquid or solid states. A solid organic binder can be dissolved in specific liquids, mixed with the inorganic powders, and then dried to remove the liquid to produce an inorganic powder coated with the organic binder. In the invention water or nonaqueous liquids, such as alcohols, are used to dissolve the solid organic binders. If the organic binder is in a liquid form, then an additional liquid is not required.

The following paragraphs describe details of each step of the method of the invention. The first step of the method consists of preparation of glass powder. Industrial fiber glass waste, with or without organic size applied, can be used as the starting glass to prepare the powder. Any other type or form of fiber glass waste can also be used. The method of the invention is not sensitive to normal levels of contaminants in the fiber glass waste, and thus cleaning of the glass is not required. The fiber glass waste is reduced in particle size (or fiber length) down to <30 mesh (<0.6 mm). The preferred size is <100 mesh (<0.1 mm).

The procedure used for particle size reduction depends on the composition of the fiber glass waste, and also on the form of the fiber glass waste. A wide range of fiber glass compositions are produced in many different forms, which results in a variety of types of fiber glass waste. All types of fiber glass waste can be reduced in particle size by procedures which avoid the use of water in the processing. This is critical for fiber glass compositions which are adversely affected by reaction with water during processing. Fiber glass compositions which are not adversely affected by reaction with water during processing can be reduced in particle size by procedures which use water in the processing.

Prior to particle size reduction, the fiber glass waste can be heated to remove any water that may be present. If the temperature is high enough, organic matter, such as the organic size, can be removed prior to particle size reduction. Heating fiber glass waste can also cause the glass fibers to become more friable, which allows the fibers to be broken and crushed more easily. The particle size of the fiber glass waste can be reduced by any type of chopping, crushing, grinding, milling, etc. process. Several types of common ceramic processing equipment can be used for particle size reduction, such as a choppers, jaw or cone crushers, ball mills, hammer mills, vibratory mills, attrition mills, roller mills, etc. After particle size reduction, the fiber glass powder is screened through a 30 mesh sieve (or 100 mesh for the preferred particle size).

The fine glass powder (<30 or <100 mesh) that results from the particle size reduction method is combined with the desired amounts of fillers and organic binder based on the raw batch formulation used. The amounts of each component are weighed on a balance, combined, and then mixed. The organic binder is added in liquid form, either because the starting binder is a liquid, or because the binder is dissolved in water or a nonaqueous liquid, such as an alcohol. The liquid organic binder is combined with the glass and filler powders, and mixed in any type of mixer that will produce a granulated free-flowing powder, such as a pan mixer, conical blender, ribbon mixer, rotating drum mixer, etc. Excess liquid can be removed by drying in a drier, such as a fluid bed drier, or by spray drying. However, it is preferred to keep the liquid content low enough, so that a drying step is not required.

The granulated free-flowing powder of the raw batch formulation is formed into a green ceramic article. Green here refers to the unfired ceramic. Any type of forming method can be used, but preferably dry pressing is used. For dry pressing the powder is placed in a metal die of the desired shape and pressed with rams to compact the powder. The pressed article is then removed from the die and fired in a kiln or furnace. If a liquid is present in the pressed article, then an additional drying step in an oven can be included before firing to remove any remaining liquid.

The initial stage of the firing process consists of binder burnout to remove the organic binder. Preferably the binder burnout is conducted during the initial heating of the ceramic articles for firing. Separate processes of binder burnout and firing can also be used. In either case the organic binder must be completely removed prior to the softening and sintering of the glass powder to prevent defects from developing in the fired product. Organic binders typically burnout from about 200-400° C. The specific firing profile of temperature and time will depend on the raw batch formulation used. Preferably the temperature and time required are minimized, while still resulting in nearly 0% porosity. The maximum firing temperature required ranges from about 700° C. to about 1000° C.

The following paragraphs provide 25 examples of the invention.

EXAMPLE 1

The raw batch formulation of Example 1 consisted of 100% fiber glass waste which was obtained from a fiber glass manufacturer. The waste was from E-glass continuous fiber glass production, and had organic size applied. The fibers had been processed into small pieces by the fiber glass manufacturer. In the first step, the fiber glass waste was ground into a fine powder with a mortar and pestle. The powder was then sieved through 100 mesh (<0.1 mm). The sieved powder was pressed at 5,000 psi (pounds per square inch) without binder into a 16 mm diameter cylindrical sample in a metal die using a hydraulic press. The pressed sample was fired in a programmable box furnace to first burnout the organic size, and then to sinter the glass powder into a dense ceramic product. A maximum temperature of 900° C. was used. The resulting ceramic product had a density of 2.60 g/cc, which is greater than 99% of the theoretical density of E-glass of 2.61 g/cc. The ceramic product was translucent with smooth glaze-like surfaces.

EXAMPLE 2

The same procedure described above for Example 1 was also used for this example, except that the fiber glass waste used in Example 1 was replaced by fiber glass wool from an insulation product, and the maximum firing temperature was changed to 750° C. A high quality ceramic product resulted similar to Example 1 with smooth glaze-like surfaces.

EXAMPLE 3

The same procedure described above for Example 1 was also used for this example, except that the fiber glass waste used in Example 1 was replaced by drain glass, and the glass was heated to 130° C. to remove water before grinding with the mortar and pestle. The drain glass was obtained from a fiber glass melting furnace by a fiber glass manufacturer. The drain glass was in the form of bulk pieces of glass. A high-quality ceramic product resulted similar to Example 1 with a density of 2.61 g/cc and smooth glaze-like surfaces.

EXAMPLE 4

The same procedure described above for Example 3 was also used for this example, except that six weight percent polyvinyl alcohol binder was added to the glass powder as described below, and a 1.25 inch square shaped sample was pressed. The polyvinyl alcohol binder was first dissolved in water, and then mixed with the glass powder. The glass-binder mixture was dried in an oven at about 90° C. to remove the water. The dried mixture was ground with a mortar and pestle, and sieved through 30 mesh. After the pressing and firing steps, a high-quality ceramic product resulted similar to Example 1 with a density of 2.59 g/cc and smooth glaze-like surfaces.

EXAMPLE 5

The same procedure described above for Example 1 was also used for this example, except that the fiber glass waste used in Example 1 was replaced by a second E-glass continuous fiber glass waste, and the glass was heated to 800° C. before grinding in the mortar and pestle. This waste was obtained from a fiber glass manufacturer, and did not have organic size applied. The fibers were about 12 inches in length, which was much larger than the fiber lengths of the fiber glass waste used in Example 1. A high-quality ceramic product resulted similar to Example 1 with a density of 2.61 g/cc and smooth glaze-like surfaces.

EXAMPLE 6

The same procedure described above for Example 5 was also used for this example, except that six weight percent polyvinyl alcohol binder was added to the glass powder as described below, and a 1.25 inch square shaped sample was pressed. The polyvinyl alcohol binder was first dissolved in water, and then mixed with the glass powder. The glass-binder mixture was dried in an oven at about 90° C. to remove the water. The dried mixture was ground with a mortar and pestle, and sieved through 30 mesh. After the pressing and firing steps, a high-quality ceramic product resulted similar to Example 1 with a density of 2.60 g/cc and smooth glaze-like surfaces.

EXAMPLE 7

The same procedure described above for Example 1 was also used for this example, except that the fiber glass waste used in Example 1 was replaced by a third E-glass continuous fiber glass waste, and the glass was heated to 800° C. before grinding in the mortar and pestle. This waste was obtained from a fiber glass manufacturer, and had a larger amount of organic size applied compared to the fiber glass waste used in Example 1. The fibers were about 12 inches in length, which was much larger than the fiber lengths of the fiber glass waste used in Example 1. A high-quality ceramic product resulted similar to Example 1 with a density of 2.60 g/cc and smooth glaze-like surfaces.

EXAMPLE 8

The same procedure described above for Example 7 was also used for this example, except that six weight percent polyvinyl alcohol binder was added to the glass powder as described below, and a 1.25 inch square shaped sample was pressed. The polyvinyl alcohol binder was first dissolved in water, and then mixed with the glass powder. The glass-binder mixture was dried in an oven at about 90° C. to remove the water. The dried mixture was ground with a mortar and pestle, and sieved through 30 mesh. After the pressing and firing steps, a high-quality ceramic product resulted similar to Example 1 with a density of 2.59 g/cc and smooth glaze-like surfaces.

EXAMPLE 9

The same procedure described above for Example 7 was also used for this example, except that the fiber glass waste was heated to 750° C., instead of 800° C., before grinding in the mortar and pestle. A high-quality ceramic product resulted similar to Example 1 with a density of 2.63 g/cc and smooth glaze-like surfaces.

EXAMPLE 10

The same procedure described above for Example 9 was also used for this example, except that six weight percent polyethylene glycol binder was mixed with the glass. The polyethylene glycol binder was in liquid form at room temperature, and thus no additional liquid was added. After the pressing and firing steps, a high-quality ceramic product resulted similar to Example 1 with a density of 2.60 g/cc and smooth glaze-like surfaces.

EXAMPLE 11

The same procedure described above for Example 9 was also used for this example, except that six weight percent polyvinyl alcohol binder was added to the glass powder as described below, and a 1.25 inch square shaped sample was pressed. The polyvinyl alcohol binder was first dissolved in water, and then mixed with the glass powder. The glass-binder mixture was dried in an oven at about 95° C. to remove the water. The dried mixture was ground with a mortar and pestle, and sieved through 100 mesh. After the pressing and firing steps, a high-quality ceramic product resulted similar to Example 1 with a density of 2.59 g/cc and smooth glaze-like surfaces.

EXAMPLES 12-14

The same procedure described above for Example 1 1 was also used for these examples, except that 2.5 weight percent of the fiber glass waste was replaced with a colorant filler. Three commercially available ceramic colorants were evaluated (also referred to as ceramic stains). Example 12 used a white colorant; Example 13 a light blue colorant; and Example 14 a dark blue colorant. High quality ceramic products resulted similar to Example 1, except that the colors of the ceramic products corresponded to the colorant used. The densities of the ceramic products ranged from 2.60 to 2.63 g/cc. These examples demonstrate the ability of producing ceramic products with different colors by the invention.

EXAMPLE 15

The same procedure described above for Example 7 was also used for this example, except that the fiber glass waste was milled instead of grinding with a mortar and pestle as described below, and polyethylene glycol binder was added as described in Example 10. After heating at 800° C., the fiber glass waste was milled in water in an alumina ball mill with alumina media, and then sieved through 100 mesh (<0.1 mm). The milled glass was then dried in an oven at about 115° C. to remove the water. The dried glass powder was sieved again through 100 mesh (<0.1 mm). After adding the binder, pressing, and firing, a high-quality ceramic product resulted similar to Example 1 with a density of 2.63 g/cc and smooth glaze-like surfaces.

EXAMPLES 16-22

The same procedure described above for Example 15 was also used for these examples, except that 2.5 weight percent of the fiber glass waste was replaced with a colorant filler. Seven commercially available ceramic colorants were evaluated (also referred to as ceramic stains). Example 16 used a white colorant; Example 17 a yellow colorant; Example 18 a green colorant; Example 19 used a light blue colorant; Example 20 a dark blue colorant; Example 21 a red colorant; and Example 22 a black colorant. High quality ceramic products resulted similar to Example 1, except that the colors of the ceramic products corresponded to the colorant used. The densities of the ceramic products ranged from 2.61 to 2.66 g/cc. These examples demonstrate the ability of producing ceramic products with a wide range of colors by the invention.

EXAMPLES 23-24

The same procedure described above for Example 7 was also used for these examples, except that the fiber glass waste was milled instead of grinding with a mortar and pestle as described below, and 5.0 weight percent of the fiber glass waste was replaced with a filler. After heating at 800° C., the fiber glass waste was milled in water in an alumina ball mill with alumina media, and then sieved through 100 mesh (<0.1 mm). The milled glass was then dried in an oven at about 115° C. to remove the water. The dried glass powder was sieved again through 100 mesh (<0.1 mm), and then mixed with two fillers. Example 23 used a filler of silica powder, and Example 24 used a filler of alumina powder. High quality ceramic products resulted similar to Example 1, except that the surface texture of the ceramic products roughened. The density of the ceramic products of both examples was 2.61 g/cc. These examples demonstrate the ability of utilizing filler additives to change the surface texture of ceramic products made by the invention.

EXAMPLES 25

The same procedure described above for Example 7 was also used for this example, except that the fiber glass waste was milled instead of grinding with a mortar and pestle as described below, and 5.0 weight percent of the fiber glass waste was replaced with a filler. After heating at 800° C., the fiber glass waste was milled in water in an alumina ball mill with alumina media, and then sieved through 100 mesh (<0.1 mm). The milled glass was then dried in an oven at about 115° C. to remove the water. The dried glass powder was sieved again through 100 mesh (<0.1 mm), and then mixed with a filler of kaolin clay powder. A high quality ceramic product resulted similar to Example 1. The density of the ceramic product was 2.58 g/cc. This example demonstrates the ability of utilizing a clay filler additive to act as an inorganic binder during processing.

A detailed description of the invention with examples was described above. It is understood that various other changes and modifications can be made to the present invention by those skilled in the art without departing from the scope of the invention. For example, a glaze can also be applied to the ceramic product if desired, but is not necessary. A glaze can be applied before firing, so that only one firing is required. A glaze can also be applied after firing, but then a second firing is required.

What is claimed is:

1. A method for making a ceramic product from fiber glass waste, comprising:
   heating the fiber glass waste;
   reducing the heated fiber glass waste into a glass powder;
   mixing the glass powder with additives into a glass-additives mixture;
   granulating the glass-additives mixture into granulated particles;
   forming the granulated particles into a green ceramic article; and
   heating the green ceramic article into the ceramic product.

2. The method according to claim 1, wherein the heating of the fiber glass waste comprises heating to remove water, burn out organic matter, and/or increase the friability of the fiber glass waste.

3. The method according to claim 1, wherein the reducing of the fiber glass waste into the glass powder comprises reducing the fiber glass waste to pieces with fiber lengths less than about 0.6 mm.

4. The method according to claim 1, wherein the reducing of the fiber glass waste into the glass powder comprises reducing the fiber glass waste with a liquid added.

5. The method according to claim 1, wherein the reducing of the fiber glass waste into the glass powder comprises reducing the fiber glass waste with water added.

6. The method according to claim 1, wherein the reducing of the fiber glass waste into the glass powder comprises reducing the fiber glass waste without a liquid added.

7. The method according to claim 1, wherein 70-100 weight percent of the glass-additives mixture is comprised of the waste glass, 0-20 weight percent of the glass-additives mixture is comprised of fillers, and 0-10 weight percent of the glass-additives mixture is comprised of organic binders.

8. The method according to claim 1, wherein the additives are comprised of fillers, consisting of silica, alumina, zirconia, clay, feldspar, and/or any other ceramic raw material.

9. The method according to claim 1, wherein the additives are comprised of fillers, consisting of clay, sodium silicate, and/or any other inorganic binder.

10. The method according to claim 1, wherein the additives are comprised of filler, consisting of inorganic colorants.

11. The method according to claim 1, wherein the additives are comprised of fillers, consisting of coarse-sized particles added to roughen a surface texture of the ceramic product.

12. The method according to claim 1, wherein the additives are comprised of fillers added to improve a property of the ceramic product, including but not limited to mechanical, chemical durability, and thermal properties.

13. The method according to claim 1, wherein the additives are comprised of aqueous organic binders.

14. The method according to claim 1, wherein the additives are comprised of nonaqueous organic binders.

15. The method according to claim 1, wherein the mixing of the glass powder with additives into a glass-additives mixture is comprised of mixing of the glass powder with additives in a liquid.

16. The method according to claim 1, wherein the mixing of the glass powder with additives into a glass-additives mixture is comprised of mixing of the glass powder with additives in water.

17. The method according to claim 1, wherein the mixing of the glass powder with additives into a glass-additives mixture is comprised of mixing of the glass powder with additives without a liquid added.

18. The method according to claim 1, wherein the granulating of the glass-additives mixture into granulated particles is comprised of drying the glass-additives mixture in a drier, including but not limited to a spray drier or fluid-bed drier.

19. The method according to claim 1, wherein the forming of the granulated particles into a green ceramic article is comprised of pressing or extrusion.

20. The method according to claim 1, wherein the heating of the green ceramic article into the ceramic product comprises firing the green ceramic article to a maximum temperature of about 700° C. to about 1000° C.

21. The method according to claim 1, wherein the heating of the green ceramic article into the ceramic product comprises drying the green ceramic article to remove liquid, followed by firing to a maximum temperature of about 700° C. to about 1000° C.

22. The method according to claim 1, wherein the heating of the green ceramic article into the ceramic product causes partial crystallization of the ceramic product.

23. The method according to claim 1, wherein the ceramic product comprises tile or brick.

24. The method according to claim 1, wherein the ceramic product has a smooth glossy surface.

25. The method according to claim 1, wherein the ceramic product is further processed by applying a glaze thereon.

* * * * *